Jan. 24, 1967   M. M. ANDERSON   3,299,970
ICE HOLE REAMER AND LIFTER
Filed Aug. 5, 1964   2 Sheets-Sheet 1
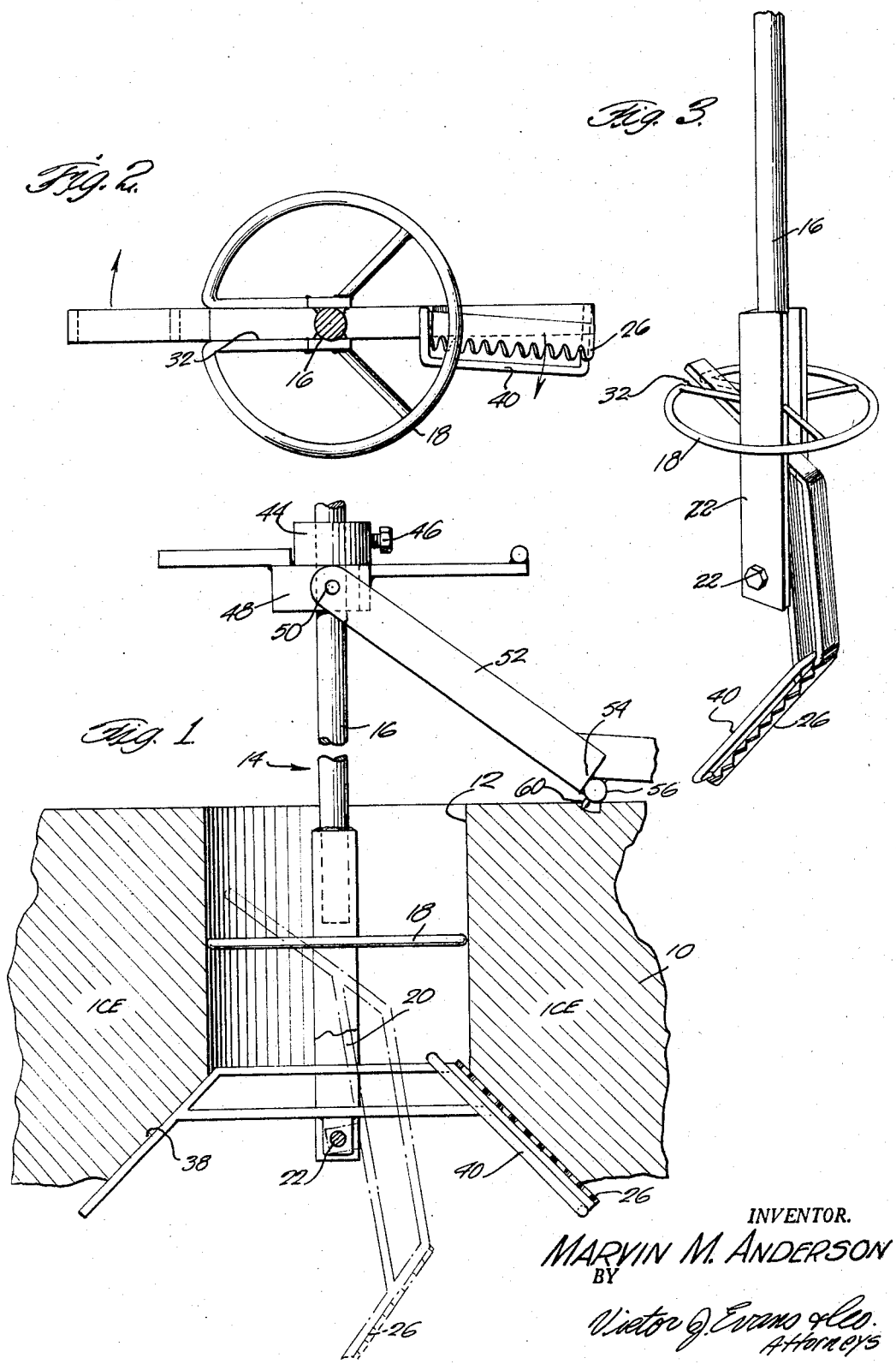
INVENTOR.
MARVIN M. ANDERSON
BY
Victor J. Evans & Co.
Attorneys

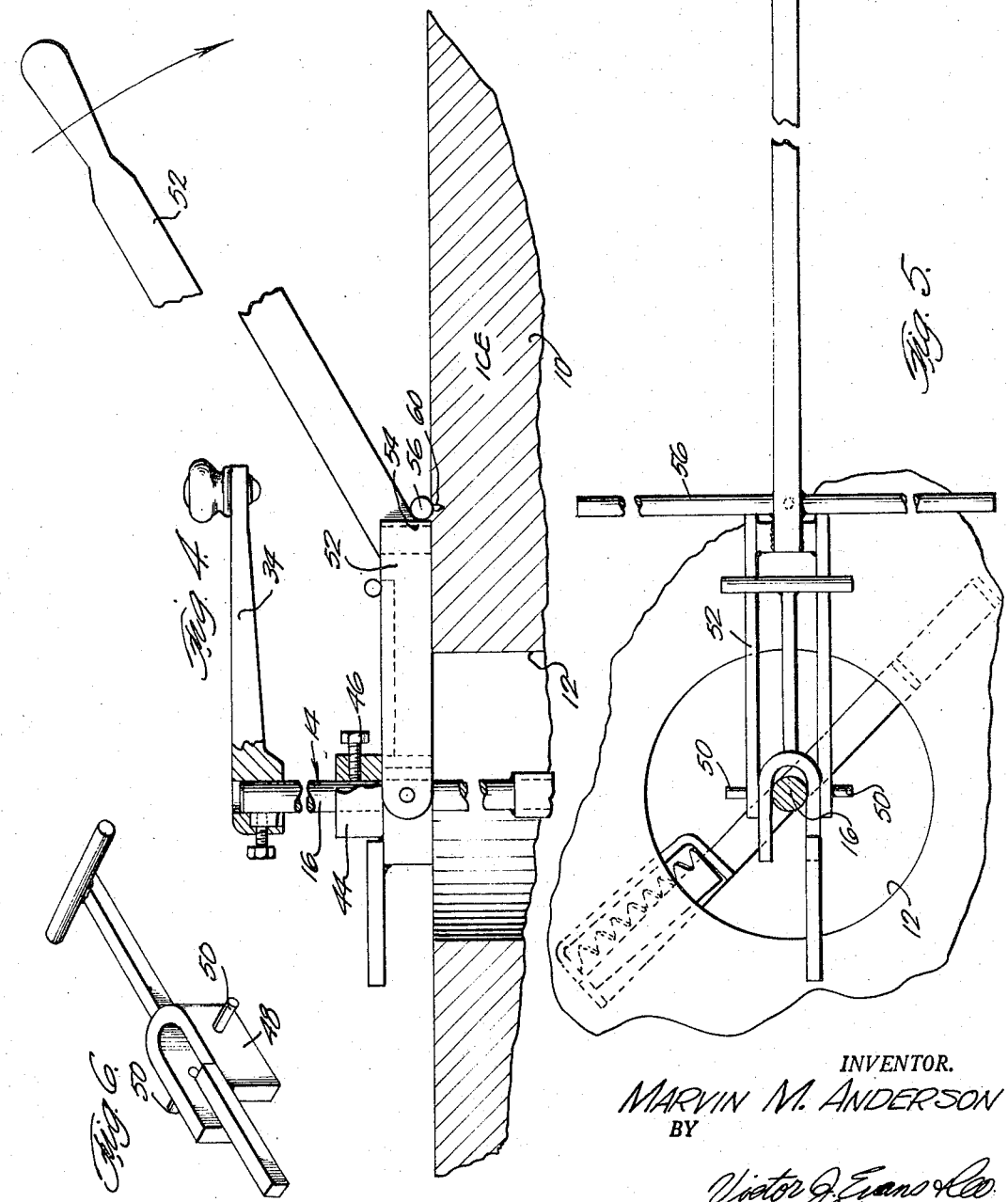

United States Patent Office 3,299,970
Patented Jan. 24, 1967

3,299,970
ICE HOLE REAMER AND LIFTER
Marvin M. Anderson, South Shore, S. Dak. 57263
Filed Aug. 5, 1964, Ser. No. 387,616
5 Claims. (Cl. 175—18)

The present invention relates to an improved ice hole reamer and lifter in which a small pre-cut ice hole opening is cut to a larger, funnel-shaped ice hole having the advantage that it is easier to get large fish started up through the pre-cut smaller ice hole as well as to keep fish and hooks from catching onto the lower edge of the ice.

More particularly, the invention relates to means facilitating the drilling or cutting of enlarged holes in ice for ice fishing, in which such means is designed to be dropped or to be placed through a previously cut or augered ice hole. The means includes a mechanical lifter disposed on the upper end of the ice hole reamer for mounting the cutting equipment with respect to the ice surface, and also provides means for lifting the equipment partially from the ice hole.

An object of the invention is to provide means for lowering and lifting ice cutting equipment into a pre-cut small ice hole, and for providing actual cutting the lower edges of the pre-cut ice hole by lifting up on the cutting means for thus reaming the ice by turning the handle of the upper end thereof.

A further object of the present invention is to provide users of the equipment with means for enlarging ice holes of small sizes such as 5 to 8 inches, to a larger size without the extra effort of cutting or making the larger hole in thick ice, as well as the advantage of cutting a funnel-shaped hole for making it easier to get large fish started up the hole and to keep the fish and hooks from catching on to lower edges of the ice.

Other objects and advantages will be apparent from the following description of certain novel details of the construction of the invention. In the accompanying drawings, which form a part of the application, and in like numerals used to designate like parts throughout the description of the drawings, it is seen that:

FIGURE 1 is a cross-sectional side elevational view of an ice hole reamer and lifting means provided in a conventional small pre-cut ice hole made in the ice and in which the lower extremity of the ice hole has been cut by the ice hole reamer in accordance with a preferred embodiment of the present invention;

FIGURE 2 shows a plan view of the guide ring mounted on a shaft or rod of the ice hole reamer, and the ice cutting blade mounted at the end of the rod;

FIGURE 3 shows a perspective view of the lower end of the rod having the guide ring and the ice cutting blade pivotally mounted at the lower extremity thereof in accordance with the preferred embodiment of the present invention;

FIGURE 4 shows a cross-sectional view of the lifting mechanism of the ice hole reamer in which a handle is provided on the upper extremity of the rod, and a collar and fulcrum means are provided for lifting as well as orienting the ice hole reamer with respect to the pre-cut hole in the ice, all in accordance with a preferred embodiment of the present invention;

FIGURE 5 shows a top plan view of the ice hole lifter means, as shown in FIGURE 4; and FIGURE 6 shows a perspective view of the lifting device which has been shown in FIGURES 4 and 5.

Referring now to the drawings, there is shown a section of a pond or lake in which is formed on the surface thereof a thickness of ice 10 having an opening or ice hole 12 previously cut therethrough. The hole is made to extend through the entire layer of ice, and is adaptable in size for extending an ice hole reamer 14 through the small opening of the ice hole 12. The ice hole reamer 14 includes a rod 16 which is a circular shaft or iron bar upon which is mounted a guide ring 18 at a position intermediate the length thereof. A preferred embodiment of the invention provides for the lower end of the rod 16 to have a pair of flat plates 20 that are welded and made secure onto the rod 16, upon which the guide ring preferably is mounted. The lower ends of the pair of plates 20 are connected by a nut and bolt arrangement 22 which forms a pivotal mounting for an eccentrically mounted ice cutting blade 26. The ice cutting blade 26 in FIGURE 1 is shown generally and substantially centrally mounted on the arrangement 22 so that when it is symmetrically disposed about the pivot arrangement 22, it is adapted for cutting a tapered or funnel-shaped hole in and on the underside of the ice and symmetrically disposed about the ice hole 12.

The ice hole reamer 14 is inserted and withdrawn from the ice hole by allowing the ice cutting blade 26 to tilt as a result of its eccentric mounting on the nut and bolt arrangement 22, so that it tilts as shown in dotted line in FIGURE 1. In this way, the tilted position of the ice cutting blade 26 is adapted to pass through the ice hole 12, and since the guide ring 18 is positioned generally close to the ice cutting blade so that it orients the ice hole reamer in the hole as the ice is cut from below, it is necessary that the guide ring engage the opening surface of the hole to provide the ice cutting blade for performing the function of cutting the ice into a funnel-shaped hole. The guide ring 18 is provided with a recess 32 for providing the substantial vertical disposition of the ice cutting blade so that the upper extremity of the ice cutting blade is received in the recess of the guide ring.

In the construction of the ice hole 12, the ice hole is previously cut in the ice by an ice auger, and may be a six inch ice hole. The guide ring is in place in the six inch ice hole for giving stability to the ice hole reamer as it is turned about the rod 16. The rod 16 is turned by a crank handle or crank arm 34, shown in FIGURE 4, so that the ice cutting blade 26 cuts the tapered or funnel-shaped hole 38 shown in FIGURE 1. The cutting end or edges of the ice cutting blade 26 is provided with a rod guard 40 to protect the cutting edge teeth or blade when it is not in use, and to keep the blade from gouging the ice unevenly as well as to provide thereby a uniform cutting bite.

Incident to enlarging and developing the funnel-shaped hole on the underside of the ice for ice fishing, there is provided on the ice hole reamer 14 a collar 44 mounted on the rod 16. A set screw 46 is used to securely position the collar 44 in place.

A U-shaped bar 48 is mounted beneath the collar 44 and is wrapped around the rod 16, and the outer portions of the U-shaped bar are provided with pins 50, 50 for providing a pivotal mounting of the U-shaped bar by a lifter bar 52. The lifter bar 52 has a fulcrum point 54 intermediate the ends thereof to provide lift actuation for removing the ice hole reamer from the ice hole, as well as lowering it therein. In lifting the ice hole reamer from the hole, the crank handle 34 is turned for providing force of the ice cutting blade against the lower extremities of the ice hole 12 so that the funnel-shaped hole in the ice is therefore accomplished. In order to improve the fulcrum action of the lifter bar, a peg bar 56 may be mounted transversely of the lifter bar so that it provides a secure means along the surface of the ice as well as provides improved fulcrum action at the supporting point in the lifter bar. The peg bar 56 may include points or extensions 60 that may be useful in extending down into the surface of the ice to provide a degree of stability in the use of the lifter bar. The lifter bar may comprise a pair of plates so that one of each pair of plates engages the pin 50 of the U-shaped bar 48. The U-shaped bar 48 is also disclosed as having in FIGURE 6 sufficient extensions for enabling the ice hole reamer to rest upon the surface of the ice when the ice hole reamer is lowered sufficiently for the extensions of the U-shaped bar 48 to rest upon the peripheral portions of the ice hole 12.

In accordance with the invention and the apparatus provided therein, there is provided means for achieving a funnel shaped hole on the underside of the ice for ice fishing so that a larger or tapered funnel-shaped hole is easily obtained in order to get large fish started up the hole, as well as to keep fish and hooks from catching in and upon the edge of the ice at the lower sides thereof.

Additional embodiments of the invention in this specification will occur to others and therefore it is intended that the scope of the invention be limited only by the appended claims and not be the embodiments described hereinabove. Accordingly, reference should be made to the following claims in determining the full scope of the invention.

What is claimed is:

1. An ice hole reamer and lifter for enlarging and forming a funnel-shaped hole in the ice for ice fishing, comprising a rod having a guide ring for insertion into an ice hole, said guide ring having an outside diameter slightly smaller than the inside diameter of said ice hole, a collar adjustably secured to said rod at a point between the guide ring and the upper end of said rod, a U-shaped bar horizontally disposed and engaging said collar for support of the assembly with respect to the upper surface of the ice, a handle secured on said upper extremity of the rod for turning the rod about its axis, a lifter bar pivotally mounted at one end thereof to connect with said rod, said lifter bar being provided with a fulcrum between the ends thereof, a peg bar mounted transversely of the lifter bar adjacent the fulcrum thereof for being positioned upon the surface of the ice for supporting the lifter bar, a pivotally mounted ice cutting blade mounted on the lower end of said rod for turning with said rod when it turns upon its axis, said ice cutting blade being disposed in shape for cutting a funnel-shaped opening on the underside of said hole, a recess in said guide ring for receiving a free end of the ice cutting blade when said blade is positioned in tilted relation to the rod, said ice cutting blade being eccentrically mounted on said rod for readily being disposed to assume said tilted relation after it passes through said ice hole.

2. An ice hole reamer for enlarging and funnel-shaping holes in ice for ice fishing, comprising a rod for being vertically disposed and having a guide ring axially mounted along an intermediate portion of said rod for insertion into an ice hole, in which the outside diameter of the guide ring is slightly smaller than the diameter of said ice hole, a collar adjustably secured to said rod at a point intermediate the guide ring and the upper end of said rod, a U-shaped bar for engaging the underside of said collar for supporting the assembly on said rod, a crank handle secured on the upper extremity of the rod for turning the rod about its vertical axis, a lifter bar pivotally mounted at one end to the U-shaped bar and provided with a handle at the other end thereof, said lifter bar having a fulcrum positioned at a central portion of said rod about which a force is applied for lifting the assembly in a generally vertical direction into and out of said ice hole, a peg bar mounted transversely to the lifter bar and at the fulcrum thereof about which the lifter bar is supported upon the ice surface, a pivotally mounted ice cutting blade eccentrically mounted on the lower end of said rod for turning with said rod about its vertical axis and having cutting edges disposed to cut a funnel-shaped opening in the underside of said hole, and a recess in said guide ring for receiving a free end of the ice cutting blade when said blade is positioned in a tilted relation to said rod, said ice cutting blade being eccentrically mounted solely for the purpose of being disposed to assume a tilted relation when it is to be passed either into or out of said ice hole.

3. An ice hole reamer for enlarging and developing a funnel-shaped hole on the underside of the ice for ice fishing, comprising a vertically disposed rod having a guide ring for centrally disposing the rod in and through said ice hole, a crank handle secured on an upper extremity of said rod for turning the rod about its vertical axis, a pivotally mounted ice cutting blade arranged in an eccentrically mounted relation at the lower end of said rod for turning said rod and disposed for cutting a funnel-shaped opening on the underside of said hole when turned by said crank handle, and a recess in said guide ring for receiving a free end of said ice cutting blade when said blade is positioned in its tilted relation to the rod to enable insertion and removal of said ice hole reamer when the ice cutting blade is in said tilted relation.

4. An ice hole reamer for enlarging and funnel-shaping holes in ice for ice fishing, comprising a rod having a guide ring for insertion into an ice hole, a collar adjustably secured to said rod and mounted thereon at an intermediate portion between an upper end thereof and said guide ring, a U-shaped bar provided to bear against said collar, said U-shaped bar pivotally engaging a lifter bar and said lifter bar having a fulcrum point intermediate the ends thereof to provide lift means in removing the ice hole reamer from said ice hole, a crank handle secured on an upper end of said rod for turning the rod about its vertical axis, and a peg bar mounted transversely of said lifter bar to support the lifter bar securely from bearing directly upon the surface of said ice.

5. An ice hole reamer for enlarging and funnel-shaping holes in ice for ice fishing, comprising a vertically disposed rod having a guide ring axially mounted at an intermediate point of said rod, said guide ring being disposed for insertion into an ice hole having a slightly larger diameter, a crank handle secured on an upper extremity of said rod for turning the rod about its vertical axis, a pivotally mounted ice cutting blade mounted on the lower end of said rod for turning with said rod, said ice cutting blade being disposed for cutting a funnel-shaped opening on the underside of said ice hole, and a recess in said guide ring for receiving a free end of said ice cutting blade when said blade is positioned in a tilted relation about its pivotally mounting with respect to said rod, said ice cutting blade being eccentrically mounted on said rod for readily being disposed to a ssume said tilted relation when not in its cutting position.

References Cited by the Examiner

UNITED STATES PATENTS

| 230,863 | 8/1880 | Cowles | 175—263 |
|---|---|---|---|
| 1,485,615 | 3/1924 | Jones | 175—263 |
| 1,589,508 | 6/1926 | Boynton | 175—267 |
| 2,133,564 | 10/1938 | Patton | 175—258 X |

FOREIGN PATENTS

| 623,051 | 7/1961 | Canada. |
|---|---|---|
| 987,666 | 4/1951 | France. |

CHARLES E. O'CONNELL, *Primary Examiner.*

D. H. BROWN, *Assistant Examiner.*